United States Patent
McDaniel et al.

(10) Patent No.: US 12,523,988 B2
(45) Date of Patent: Jan. 13, 2026

(54) SHARING WORLD MODEL OBJECTS BETWEEN MULTIPLE AUTONOMOUS SYSTEMS

(71) Applicant: Siemens Aktiengesellschaft, Munich (DE)

(72) Inventors: Richard Gary McDaniel, Hightstown, NJ (US); Beat Laemmle, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 422 days.

(21) Appl. No.: 18/004,225

(22) PCT Filed: Jul. 31, 2020

(86) PCT No.: PCT/US2020/044377
§ 371 (c)(1),
(2) Date: Jan. 4, 2023

(87) PCT Pub. No.: WO2022/025908
PCT Pub. Date: Feb. 3, 2022

(65) Prior Publication Data
US 2023/0273598 A1 Aug. 31, 2023

(51) Int. Cl.
*G05B 19/418* (2006.01)
(52) U.S. Cl.
CPC .. *G05B 19/418* (2013.01); *G05B 2219/31264* (2013.01)
(58) Field of Classification Search
CPC . G06F 9/52; G06F 9/54; G06F 19/418; G06F 2219/31264
See application file for complete search history.

(56) References Cited

U.S. PATENT DOCUMENTS

| | | | |
|---|---|---|---|
| 10,691,113 B1 | 6/2020 | Bergman | |
| 2013/0245824 A1* | 9/2013 | Barajas | B25J 9/1664 901/46 |

(Continued)

FOREIGN PATENT DOCUMENTS

| | | | |
|---|---|---|---|
| CN | 107921639 A | 4/2018 | |
| KR | 0170266 B1 * | 3/1999 | G05B 19/00 |
| WO | 2020106706 A1 | 5/2020 | |

OTHER PUBLICATIONS

Jong-Yih, Kuo et al.; "Applying assimilation and accommodation for cooperative learning of RoboCup agent"; Machine Learning and Cybernetics (ICMLC); 2010 International Conference On, IEEE; Piscataway, NJ; pp. 3234-3239; XP031759781; ISBN: 978-1-4244-6526-2.

(Continued)

*Primary Examiner* — Kidest Worku (57) ABSTRACT

A computer-implemented method includes operating a first autonomous system to perform a task based on executable code derived from objects in a world model of the first autonomous system. The world model objects of the first autonomous system represent an operating environment of the first autonomous system. The method includes determining an initiation trigger when the first autonomous system is to begin interaction with a second autonomous system. The second autonomous system is operated based on executable code derived from a world model that includes world model objects representing an operating environment of the second autonomous system. After the initiation trigger, the method includes sharing of the world model objects between the first and second autonomous systems. Subsequently, the method includes continuing operating the first autonomous system based on an extended world model of the first autonomous system that includes the shared world model objects of the second autonomous system.

18 Claims, 7 Drawing Sheets

(56) References Cited

U.S. PATENT DOCUMENTS

| | | | |
|---|---|---|---|
| 2015/0051783 A1 | 2/2015 | Tamir et al. | |
| 2015/0290802 A1* | 10/2015 | Buehler | B25J 9/1671 |
| | | | 700/259 |
| 2015/0314440 A1* | 11/2015 | Parker | B25J 9/1612 |
| | | | 700/253 |
| 2016/0018886 A1* | 1/2016 | Song | G06F 3/04815 |
| | | | 715/757 |
| 2016/0136815 A1* | 5/2016 | Linnell | B25J 9/1676 |
| | | | 700/255 |
| 2017/0136621 A1* | 5/2017 | Benaim | G06F 3/0484 |

OTHER PUBLICATIONS

Gharbi, Atef et al.; "Reactivity and social cooperation in a Multi-Robot System"; 2015 10th International Joint Conference On Software Technologies (ICSOFT); SCITEPRESS; vol. 1; pp. 1-8; XP032931072.

Inceoglu Arda et al.; :; "Continuous Visual World Modeling for Autonomous Robot Manipulation";Publish date: Dec. 31, 2018.

Jing Hua Yang et al.; "Simulation of Cooperative Robot System under Virtual Environment"; Publish date: Nov. 7, 2016.

* cited by examiner

SHARING WORLD MODEL OBJECTS BETWEEN MULTIPLE AUTONOMOUS SYSTEMS

TECHNICAL FIELD

The present disclosure relates generally to the field of autonomous systems, and in particular, to a technique for communication between autonomous systems.

BACKGROUND

Most automated systems are not autonomous systems. In conventional automation, a typical strategy for implementing intermachine communication is for a programmer to write custom, hand-tailored code for the specific task at hand. In this paradigm, one machine would send a custom message to another that must also use hand-tailored code to interpret the message and act accordingly. Typically, automation programs are programmed entirely using original custom code by a programmer. Since the whole program is original, also having to program the communication between systems would be expected. The contents of an automation program are low-level instructions given in a recipe like manner for what steps the devices must do. There is usually not a direct representation of the task the devices are performing or the objects the devices manipulate.

SUMMARY

Briefly, aspects of the present disclosure are directed to a technique for communication between autonomous systems based on sharing of knowledge about a state of the operating environment of each of the autonomous systems.

According to an aspect of the present disclosure, a computer-implemented method comprises operating a first autonomous system to perform a task based on executable code derived from objects in a world model of the first autonomous system. The world model of the first autonomous system comprises a plurality of world model objects that represent an operating environment of the first autonomous system. The method further comprises determining an initiation trigger when the first autonomous system is to begin interaction with a second autonomous system. The second autonomous system is operated based on executable code derived from objects in a world model of the second autonomous system, which comprises a plurality of world model objects that represent an operating environment of the second autonomous system. The method further comprises, responsive to the initiation trigger, initiating data communication between the first autonomous system and the second autonomous system, wherein the data communication comprises sharing of the world model objects between the first autonomous system and the second autonomous system. The method further comprises continuing operating the first autonomous system based on an extended world model of the first autonomous system that includes the shared world model objects of the second autonomous system.

Other aspects of the present disclosure embody features of the above-described method in an autonomous system and a computer program product.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present disclosure will be described with reference to exemplary non-limiting embodiments.

Aspects of the present disclosure described below relate to autonomous systems that are engineered in a skill-based programming paradigm. In conventional automation, an automated robot is typically programmed to perform a single, repetitive task, such as positioning a car panel in exactly the same place on each vehicle. In this case, an engineer is usually involved in programming an entire task from start to finish, typically utilizing low-level code to generate individual commands. In the presently described autonomous system, a physical device, such as a robot, is programmed at a higher level of abstraction using skill functions instead of individual commands.

Figure 1:
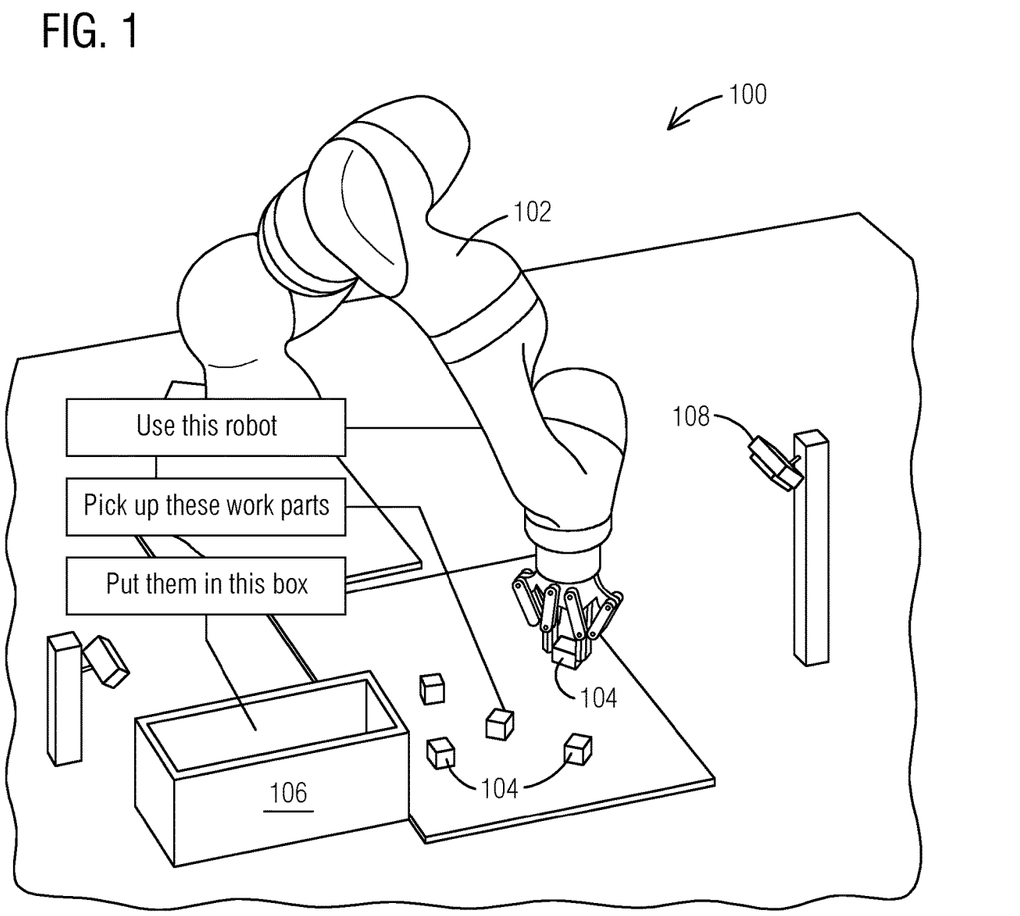
FIG. 1 illustrates an example of an autonomous system implemented with high-level abstract tasks based on a world model.

An autonomous system performs tasks based on its knowledge of the environment (or "world") in which it operates. Referring to FIG. 1, an autonomous system 100 according to aspects of the present disclosure comprises a controllable physical device, such as a robot 102, which is operated based on an application program running on an associated computing system (see, for example, FIG. 7). The computing system may comprise, for example, an industrial PC or a general-purpose computer such as a desktop or a laptop, among others, which may be connected by a wired link or wirelessly to the robot 102. The autonomous system 100 automatically tracks the state of devices and products in its operating environment using a world model of the autonomous system 100. The world model comprises a digital copy of the physical artifacts that the application continually keeps up to date with knowledge from the actual environment of the autonomous system 100.

In the example shown in FIG. 1, the robot 102 is given a task of picking up work parts 104 and storing them into a box 106. This could be one element of a larger task such as providing work part kits for another process or selecting products for an online order. The task of the robot 102 is designated as skills such as pick the parts and put them into the box. The robot 102, the work parts 104, the box 106, and the surrounding physical elements are all part of the program and are represented explicitly. Knowledge about where the work parts 104 are located and how to pick up a work part 104 is explicitly encoded by the work part 104 being in some location in the robot program's virtual world. The task of picking up a work part 104 is not encoded by referring specifically to any one work part 104 since the robot 102 cannot know what work parts 104 will be present until it is running. Instead, the task may be implemented as a search on physical volume. Any work part 104 appearing in the volume is a target to be picked. Likewise, a camera 108 that detects the parts communicates its result by populating the world model of the robot 102 with virtual instances of the work parts 104 to be picked. The camera 108 does not require a special, custom-coded communication interface but can communicate as a manipulation of the world model.

The world model of the autonomous system comprises a plurality of world model objects that represent a state of the operating environment of the autonomous system, from which executable code is derived for operating the autonomous system. The world model objects are program objects, and may comprise, among other objects, one or more objects corresponding to physical objects in the operating environment. The physical objects include the controllable physical device itself and physical artifacts that it manipulates or interacts with. The world model objects may further comprise one or more objects corresponding to one or more markers on simulated objects in the operating environment of the autonomous system. The world model objects may further comprise one more objects corresponding to skill functions of the autonomous system that are necessary to perform the task(s) specified by the application. A detailed description of an example implementation of the above described world model objects can be found in the International Patent Application No. PCT/US2017/054651 by the present applicant, titled "ENGINEERING AUTONOMOUS SYSTEMS WITH REUSABLE SKILLS", published as WO 2019/066979, which is incorporated by reference herein in its entirety. It is to be noted that the actual format of the world objects that are being shared can be different for different applications.

Utilizing a world model, an autonomous system may perform tasks based on high-level knowledge about itself and its environment. Instead of programming an autonomous system based on primitive electrical signals or fixed movements, one may thus implement an application by describing activities based on the objects the system manipulates and transforms. Because applications are designed with such high-level knowledge of the activities, it becomes possible for multiple autonomous systems to interact without requiring significant custom programming.

When two or more autonomous systems need to interact, it may be desirable for the systems to share knowledge about the state of their respective environments. The actions of these autonomous systems are based on the state of environmental objects, such as where work parts are located, or which objects need to be assembled first. By knowing the state of a nearby peer autonomous system, an autonomous application can assist and take on tasks by following its own edicts but applying them to the peer system's objects.

Embodiments of the present disclosure are generally directed to a technique for sharing information between peer autonomous systems by formalizing the objects that the autonomous systems use for environmental representation. The "represented" environment in this case is the "world model," which represents all the objects that an autonomous system uses in its function. Instead of passing custom messages between autonomous systems, the autonomous systems synchronize on a set of shared world model objects. Different world model objects may originate from different autonomous systems, but once shared, each autonomous system holds information about these world model objects and can use the data for reasoning and completion of tasks.

Figure 2:
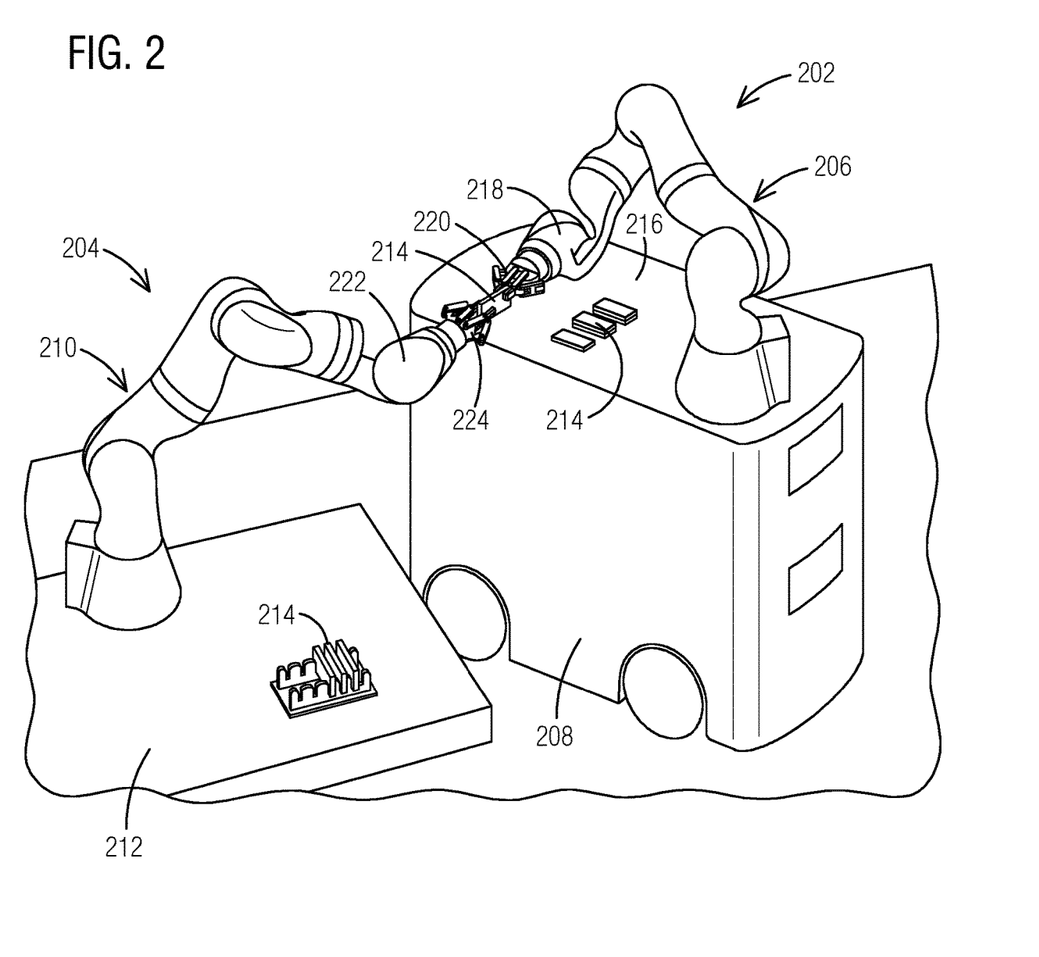
FIG. 2 illustrates an example of two autonomous systems interacting based on shared world model objects.

In FIG. 2, an example is shown where two autonomous systems 202, 204 interact physically by passing a work part 214 from one system to another. The first autonomous system 202 comprises a mobile robot 206 with a wheeled cart 208 and a robot arm 218 with a gripper 220. The second autonomous system 204 comprises a stationary robot 210 with a robot arm 222 with gripper 224 which is fixed in place on a worktable 212. The first and second autonomous systems 202, 204 may be independently controlled, each having their own respective computing system, which are not shown in FIG. 2 (see, for example, FIG. 7). Each of the autonomous systems 202, 204 is operated based on executable code derived from objects in a world model of the respective autonomous system. The world model of each autonomous system 202, 204 comprises a plurality of world model objects that represent a state of an operating environment of the respective autonomous system.

In the example shown in FIG. 2, work parts 214 are stacked on the cart surface 216. The mobile robot 206 hands the stationary robot 210 a work part 214 from the cart surface 216. Ordinarily, this kind of interaction between robots would be difficult to carry out especially since the mobile robot 206 can move and its position with the stationary robot 210 is not fixed. However, the mobile robot 206 can know its own position and use cameras or other location technologies to fix where it is relative to the stationary robot 210. As per the present technique, when the autonomous systems 202, 204 are to begin interaction, an initiation trigger is determined (for example, based on a physical range of the systems) whereupon data communication is initiated between the autonomous systems 202, 204. The data communication involves sharing of the world model objects between the first autonomous system 202 and the second autonomous system 204. Subsequently, each autonomous system 202, 204 is operated based on an extended world model that includes the shared world model objects of the other autonomous system. As the first autonomous system 202 shares its world model objects with the second autonomous system 204, the second autonomous system 204 has up to date information about all mobile robot's constituents as well as where its work parts 214 are located. Even if the stationary robot 210 does not have its own sensors or vision technology, the shared world model of the mobile robot 206 would be sufficient for it to pick the work part 214 in the mobile robot's gripper. Likewise, sharing the world model of the second autonomous system 204 with the first autonomous system 202, the first autonomous system 202 can know when the work part 214 part is grasped by the stationary robot 210 and let go by the mobile robot 206.

Ordinarily, communication between machines is functional, wherein one machine calls a remote function on another machine to perform an action such as note when a task is complete. As per aspects of the present disclosure, the communication is representational. The communicated entities represent physical objects and devices in the world surrounding the systems performing the automation. This allows objects to be shared without requiring the automation programmer to write special functions or data formats to implement intermachine communication. Instead, the programmer formulates tasks based on the work objects and does not necessarily care what system provides the work object's presence for the machines doing the work.

In addition to sharing world model objects representing physical objects in the operating environment (which includes the controllable physical device itself and the physical artifacts that the device manipulates or interacts with), the shared world model objects may include context information pertaining to the application. An example of world model objects that provide context information includes graphical markers created on simulated objects in the world model based on instructions provided by a user via the graphical user interface. The position and orientation of the graphical markers may be determined with respect to the simulated objects. A skill function (such as pick up a work part) may comprise a functional description for using a robot to interact with the physical objects based on the position and orientation of each graphical marker.

Figure 3:
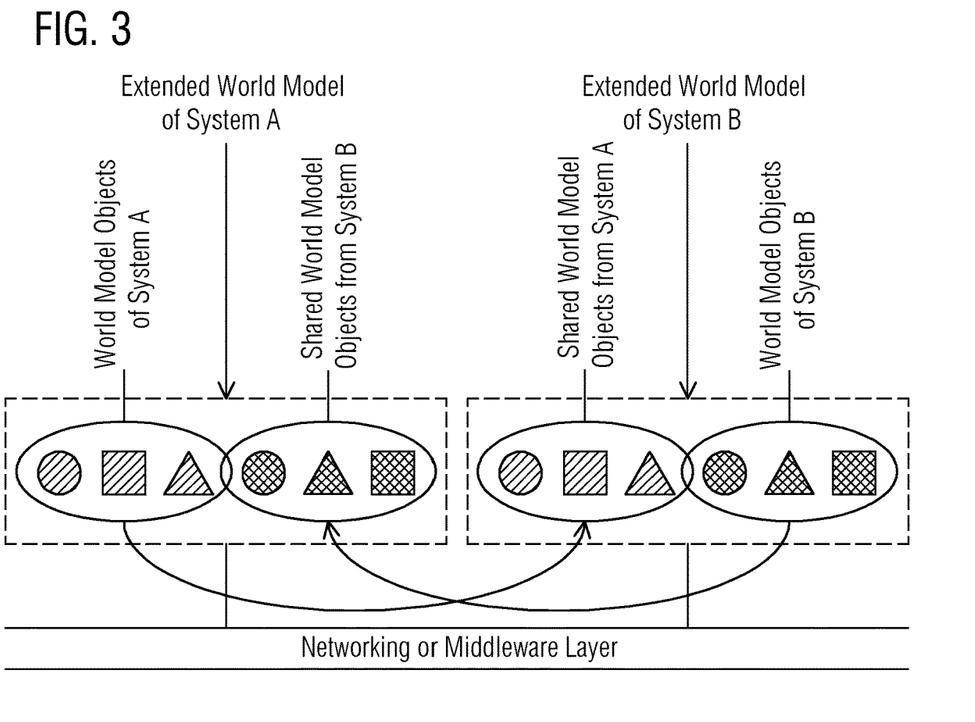
FIG. 3 schematically illustrates an embodiment where each autonomous system locally caches world model objects of another autonomous system.
Figure 4:
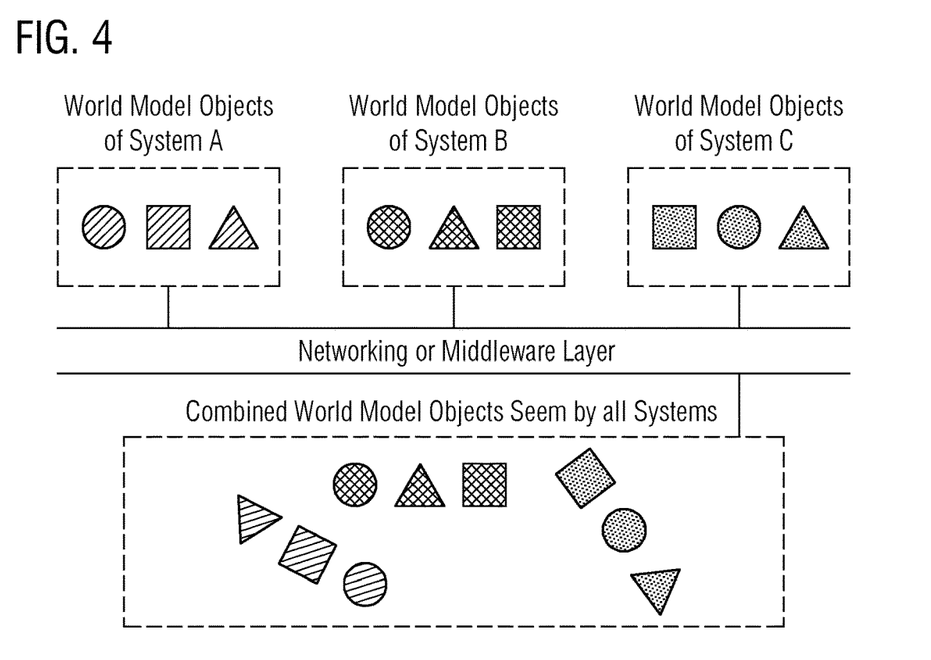
FIG. 4 schematically illustrates an embodiment where world model objects of multiple autonomous systems are accessed from a common database.

In the described embodiments, sharing world model objects is implemented via a networking or middleware layer. The networking or middleware layer may be used to synchronize information about each system's world model to the others. Upon sharing of the world model objects, each autonomous system has an extended world model that includes its own world model objects and additionally includes synchronized copies of world model objects from another autonomous system. FIG. 3 shows a high-level schematic of an embodiment where an autonomous system may cache world model objects from another autonomous system. It is also possible for autonomous systems to poll one another to discover shared world model objects. FIG. 4 shows a high-level schematic of an alternate embodiment where shared world model objects of multiple autonomous systems are collected and viewed from a common database that is accessible to each autonomous system. In this case, each autonomous system may have pointers to the world model objects of the another autonomous system and may be able to ask questions regarding those world model objects through functions, but would not have a local copy of the actual data transferred to itself.

In specific embodiments described herein, each of the autonomous systems locally caches synchronized copies of the shared world model objects of the other autonomous system (as depicted in FIG. 3) at discrete time steps. Whether or not the sharing is managed by synchronized locally cached objects as described herein or whether the objects are externally shared in a common database may be decided based on several factors. For example, if objects change quickly, the speed of the network device will come into consideration. Objects that change less frequently are more able to be stored offline or if the database posts events to systems that are following changes to a group of objects. If changes are quick or the system needs access to most of the world objects in the shared space, then caching may be more desirable.

How an autonomous system is divided into networked entities may be managed by the application developer. The camera in the example from FIG. 1 could be integrated directly into the robot's system and generate world model objects directly in a single system. It could also be separated into a local camera system where it generates world model objects for itself and these are shared with other systems such as the one controlling the robot. The system in FIG. 2 includes a mobile cart with a robot. In this case, the stationary workstation and the mobile one would need to be separately controlled systems because they are physically separated. With a networking or middleware layer, it is still possible for each system's world model to be shared with the other.

Although aspects of the present disclosure do not require a particular networking or middleware layer, it is desirable that the middleware layer provides the following features. First, the objects in a world model are not typically known a priori. The middleware cannot be configured to a fixed number of objects. It is common in automation network solutions to fix the data members of all resources such as the symbol table or HMI tags. In a world model, objects come and go. In the middleware implementation, it should be desirably possible to add and remove objects from those shared by others. Second, it should be desirably possible to reference objects within the data such as having pointers to create graph structures. The world model is not a flat structure, but has many objects at different levels of abstraction such as entities for a machine as well as entities that describe the parts of that machine such as a robot and its different moving arms and in each part, physics objects such as rigid bodies and joints. All these things form a graph of interconnected information about the state of the devices. Third, it is desirable to have a means to ship large quantities of data, especially when first beginning to share objects and for visualization. Data sets for graphical elements can be needed by various elements of an autonomous system such as display and vision, and graphical data is typically large depending on how detailed the graphics are.

In the described embodiments, the middleware Data Distribution Service (DDS) is used. In other embodiments, other protocols may be used, for example but not limited to TCP/IP using sockets, OPC, REST, among several others. In principle, the system could use any number of networking technologies and could potentially choose to use different technologies in different circumstances depending on what is available and efficient.

For the described embodiments, the features for creating tables of data are used. In DDS, one can make tables of data with a given format of data values such as numbers, strings, and arrays. The protocol has one system "publish" its data to a request broker. The broker may be a common database or a distributed peer to peer network. Other systems "subscribe" to data that are desired based on search criteria (similar to a database query). Published data can be changed frequently such that a given data element is effectively streamed and the subscribers are notified of the change and can fetch the updated data. In one non-limiting embodiment, a request broker may be implemented on each of the autonomous systems, which is kept in-synch with other request brokers in the network. In one embodiment, each of the autonomous systems may publish updated data in connection with the world model objects of that autonomous system via the middleware layer at discrete time steps. Subsequent to an initiation trigger when a first autonomous system is to begin interaction with a second autonomous system, each of the first and second autonomous systems may begin polling the other autonomous system via the middleware layer to discover published world model objects of the other autonomous system.

The shared world model objects typically comprise static data that is class-dependent and data that is subject to change at runtime. The process for achieving world model sharing may be implemented in multiple stages of data transfer. This process is independent of the factors that may cause two systems to begin or terminate sharing that are discussed separately. The stages involve transferring different kinds of data based on the frequency that data is changed.

A first stage (stage 1) of data transfer involves a one-time transfer of all static data in connection with the shared world model objects. This kind of data varies from object to object but for a given object, it will stay the same for the duration of operation. Examples include values like the types of objects, the mass of a body, the graphical shape of an entity, which are are things that do not change once the application starts. A second stage (stage 2) of data transfer involves one or more synchronizing steps that includes transfer of all data in connection with the shared world model objects that are subject to change at runtime of the respective autonomous system. Stage 2 involves values that are members of the objects in the first data class, but that do change frequently when the application is running. For example, the position and orientation of work pieces, which objects are attached to a machine, where objects are placed on a conveyor. A third stage (stage 3) of data transfer involves one or more synchronicity maintenance steps that include only transfer of data related to device control. Stage 3 is data that is specific to the control of the devices. Control data is necessarily changing like stage 2 data. however, much stage 2 data can be updated automatically in the external system because it is being controlled in a systematic way. For example, a robot may be turning at its base. This causes all the objects in the robot and whatever objects the robot is carrying to all be moving and changing position. However, only one object, the robot's base position controller is really dictating how all those objects move. So, if the controller is kept up to date, the other objects in the system will follow correctly. A fourth stage (stage 4) of data transfer involves one or more error correction steps that include transfer of data to correct errors arising due to a difference in simulation output between the first and second autonomous systems. Stage 4 may be necessary because not all simulated behavior will follow as planned. Stage 4 uses the data from stage 2 to determine if the shared systems have gone out of synchronization. If they have diverged, the systems are re-synchronized similar to stage 2.

The first stage is to transfer fundamental, static properties of the world model objects. These properties do not change as the application manipulates them. The type of an object, like whether it represents a robot or a box, and its component parts such as physics objects, collision surfaces, and kinematic joints are examples of static properties. The static object elements form a graph. A robot will have parts such as its base, several arms, and a flange and those parts will have subparts such as an arm having properties for a rigid body, kinematic joints such as rotary and linear connections, controllers for positions or other properties, collision surfaces, and others. Since DDS does not have a native reference pointing scheme, objects are assigned Globally Unique Identifiers (GUIDs). References between objects are denoted by using its GUID. To publish the static object data to DDS, the system makes a flat list of all the objects that need to be transferred. These are sorted by type. For each type of object, the present technique uses a DDS table format. Each line of the table is associated with an object. Extra data is needed to be stored in the table entry besides the member data of the object in order for it to be reconstructed in another system. For example, the GUID of the owner of a part in an assembly is written to the table whereas in the ordinary object, the assembly keeps a list of pointers to its parts. Redundant data can be removed to reduce the size. Some static data is too large to be published in a DDS table. For example, the shape of a convex collision shape can contain an arbitrary number of points. For these kinds of data, a streaming network protocol such as TCP/IP may be used.

For the most part, the types of world model objects (class definitions) being shared are known and will be implemented by all autonomous systems that intend to share world objects derived from them. In this way, table formats for the DDS can be defined generically by the system library and does not require user intervention. If the library is extended to include new types, new DDS formats will also be included in the extension. Generally, if an autonomous system intends to import an object for a type that it does not know, it would not be able to interpret its semantics meaningfully. If this were to become needed in the future, one can suppose that the corresponding dynamic library code implementation for the new unknown type (compiled for the right machine or interpreter) could be shipped to the importing system so that it can run.

The second stage is to transfer synchronizing data for all transient values, i.e., values that can potentially change at runtime. This includes where parts are located in space, their velocities and angular velocities (typically in all six degrees of freedom) and transforming values such as logical states, being on or off, and numerical values. Referential data can also be transitory and need to be synchronized. For example, when a device picks up a work piece, it forms a bond between the body of the part and the body of the gripper (or whatever is doing the picking). That bond can be implemented as a fixed joint whose "attach" member is set to the body of the work piece. The "base" member of the fixed joint is permanently set to the body of the gripper. Since the "attach" value changes depending on which object the gripper is holding, it needs to be synchronized along with the positions of the gripper's bodies and the work piece.

There are key moments where values change based on the actions of the application. These moments need to be synchronized to keep each system in alignment. For example, when an object gets picked up, the joints for the gripper will change to become attached to the object at the moment of pick up. If the joint changes to be connected to the object, but the object is not moved to be aligned correctly with the gripper, then the object will be attached to the gripper but be in the wrong spot (like being grabbed magically in space). Changes where object hierarchy or linkages change always require synchronization at the time step where the change happens. If the synchronization does not occur there, then a full synchronization may be required to put objects into their proper state.

The third stage is the maintenance stage where synchronicity is maintained between shared world model objects. The third stage involves transfer of only values that are related to device control, for example including controller values, values of switches, etc., which is a much smaller set of values than the second stage and hence can be updated at a higher frequency with lower latency. The controllers may include, for example, position controllers for controlling rotational position of the robot arm, position controllers for controlling rotational position of the robot base, motion controllers for controlling linear displacement of the robot, among others. The controllers may be implemented in simulation, for example, as virtual motors.

Figure 5:
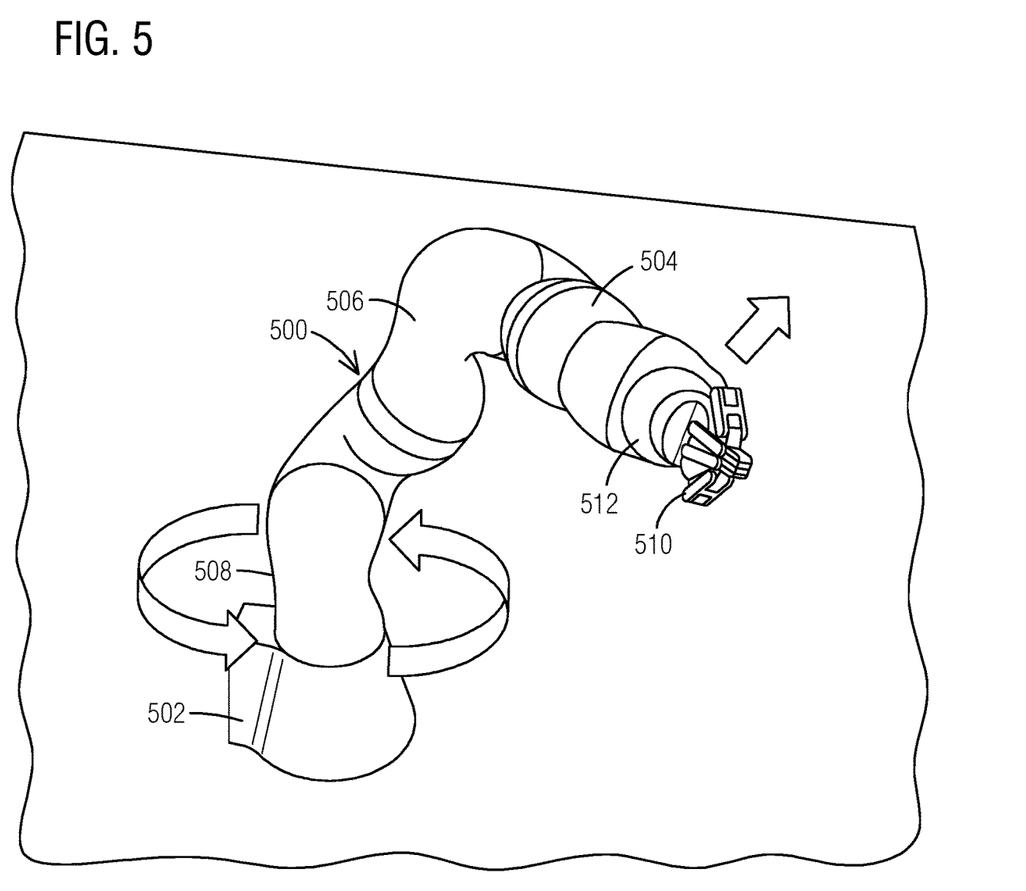
FIG. 5 illustrates how movement of objects may be controlled by a small number of constraints.

The difference between stage 2 and stage 3 data transfer is based on the recognition that device objects will behave in a predictable manner, such that all values do not need to be synchronized all the time. For example, if the structural linkages between device objects are not changed, then movements can be linear and predictable. Even if an object is in free fall, since the physics are computed the same on both the originator and the importing system, the state of that object is predictable until it hits something (that is when constraints change). There are a number of key values, such as the destinations of motion/position controllers and the values of switches that need to be maintained during this stage. Other values, such as a robot's position and orientation in space will transpire as a consequence of these key values following their dictates. For example, an angular position controller may be used to swivel the base 502 of a robot 500 as shown in FIG. 5. Presume for simplicity that the other joints are held still, though this is not a requirement. As the base 502 turns, the other objects such as the arms 504, 506, 508, the gripper 510 and the flange 512 all move in a predictable way according to their relative positions. As a result, in this example, most of the time, only the position of the angular position controller of the base 502 and the other controllers in the arm are needed to place all the objects connected to robot, whereby the robot's objects themselves, such as location and velocity of the internal rigid bodies, do not need to be individually synchronized.

The speed of the controllers may be used to influence the quality of the synchronization. Two systems will not generally run at identical speeds, especially, if they are running on different controllers. The difference between the current value of the external controller (in the physical world) and the replicated controller in the local system can be used to adjust the speed of the replicated controller so that it matches the external controller's value over time. This method is also used to match a simulated device to the state of the physical device in the real application. Different algorithms may be used to adjust the speed. A Proportional/Integral/Differential loop or PID loop would be sufficient for the described purpose.

When the topology of the objects changes, external systems are notified that they must perform a full synch. In another implementation, specific objects may be marked for a full synch if it can be determined which objects are affected. Topology changes that occur due to application behavior may be especially important to resynchronize. When a work item is picked up or placed on another device, its fate is of critical importance and ought to be synchronized. For other kinds of constraint topology changes such as collisions, it is possible that the physics engine in both the current and external system are sufficiently accurate that they will not diverge. In this case, the physics may be allowed to run to determine the consequent state. However, the objects must still be tracked to determine if they fall out of synchronization.

The fourth stage comprises tracking changes between moving or otherwise changing objects in the simulation instantiated in multiple autonomous systems and determining if they are remaining synchronized. In general, it is not desirable to re-synchronize objects at every time step because network delay is too slow to be reliable and available. Also, it is not desirable to set the positions of objects outside the influence of the physics engine because this causes objects to effectively "teleport" or "pop" to a new location without moving in between. If one object pops into the space of another, the physics solver may apply a large compensating force to correct the overlap and send all the objects flying.

The data to be synchronized at the fourth stage may be determined based on several considerations. In one embodiment, the data to be synchronized may be determined by sampling random values. In another embodiment, the data to be synchronized may involve certain key values that are known to have a propensity of falling out-of-synch between multiple systems running a simulation. For example, a controllable device, such as a robot has a constrained movement and does not require resynchronization other than that described in stage 3. However, work parts, on the other hand, do have unconstrained motion and may necessitate resynchronization at stage 4.

It is only needed to correct objects with a synchronization if the positions are out of range of the values expected by their velocity over the number of time steps being calculated. As described above, the controllers for joints are treated specially so that their velocities are controlled to try to anticipate and catch up to the current positions of the external controller. Objects that are constrained by the positions of controllers are expected to be in range if the controllers are in the correct range. Free moving objects, such as work parts that are not being held are checked by their absolute position and orientation. If their velocities are zero, then they are not expected to move. If they do move, they must be getting pushed or otherwise affected by another object. This would constitute a topology change to the constraints and merit a resynchronization.

A key consideration for synchronization (applicable to stages 2, 3 and 4) is to retrieve the state of all objects at a single time step. On the side of the publishing system, the state of transferred objects is read into a cache while the runtime engines are held by a mutex. This way the cache may be written out to the networking layer in a separate thread and not delay the runtime engines unnecessarily. On the subscriber side, the data on the networking layers needs to be atomic. That is, the state for a portion of the objects cannot be overwritten or otherwise changed until a reader is done reading all the state for that particular system. If data can be changed before a reader reaches a portion of the objects, then those objects will be out of synch with the rest. On the reader side, one also caches the data for a complete time step and then suspends the runtime engines only for as long as needed to change all values simultaneously as well as add new objects. Memory allocation and data collection from the network is performed in a separate thread so as not to cause delays.

Sharing world models between peer autonomous systems may be initiated by various means and may also be terminated without deactivating the autonomous systems. The initiation trigger may be determined, for example, based on a physical range of the autonomous systems, or any other factors that necessitate an interaction between the autonomous systems. FIG. 6A through FIG. 6E illustrate an example (similar to FIG. 2) of transferring a work part between multiple autonomous systems. In this example, three autonomous systems are involved, namely a first autonomous system 602, a second autonomous system 604 and a third autonomous system 606. The first autonomous system 602 comprises a mobile robot 608, the second autonomous system 604 comprises a stationary robot 610 and the third autonomous system 606 also comprises a stationary robot 612. Each of the autonomous systems 602, 604, 606 are may be independently operated based on a respective application program running on their own respective computing system (see, for example, FIG. 7). The first autonomous system 602, the second autonomous system 604 and the third autonomous system 606 are each associated with a physical range, indicated by the regions R1, R2 and R3 respectively. Sharing of world model objects may be initiated by the first autonomous system 602 when its physical range become close to one of the stationary autonomous systems 604, 606.

Figure 6A:
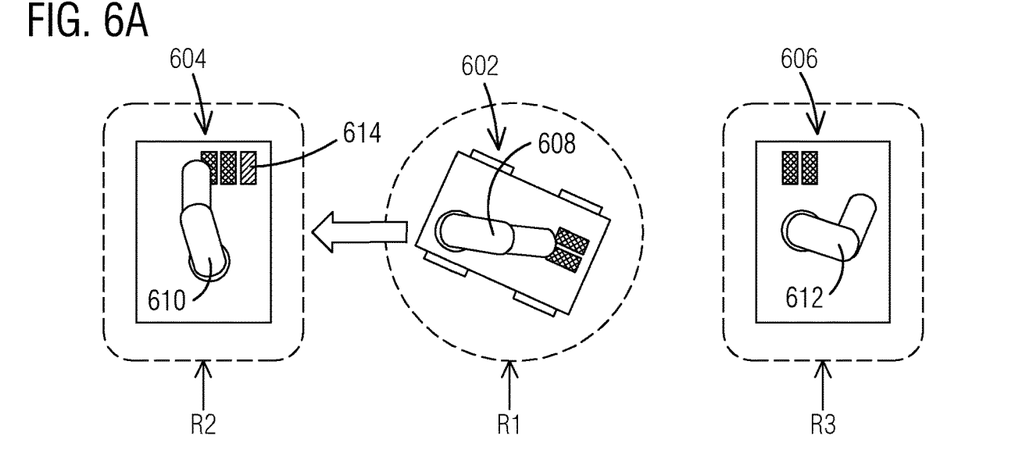
FIG. 6A through FIG. 6E illustrate a sequence of steps involving initiation and termination of the sharing of world model objects between multiple autonomous systems according to an example embodiment.

When the autonomous systems are not proximate, such as in FIG. 6A, each autonomous system has its own separate world model and is not sharing. At this point, each of the autonomous systems 602, 604, 606 may be publishing data concerning its world model objects, but not polling data from the autonomous systems. From the perspective of the mobile robot 608 of the first autonomous system 602, the stationary autonomous systems 604, 606 are represented just by their physical range. The mobile robot 608 does not see into the stationary autonomous systems' state unless the world models are shared. The place where sharing can occur can be marked in the world model of the first autonomous system 602 along with networking information that would allow the autonomous systems to connect.

Figure 6B:
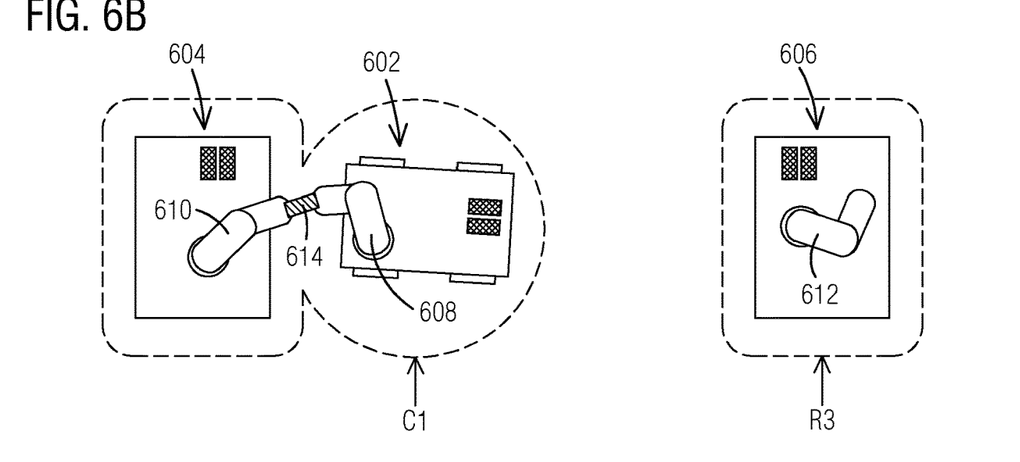

In FIG. 6B, the mobile robot 608 has moved closer to the stationary robot 610. When the physical ranges associated with the first autonomous system 602 and the second autonomous system 604 overlap as depicted by the merged region C1, an initiation trigger is determined. Responsive to the initiation trigger, the first autonomous system 602 initiates sharing of world model objects between itself and the second autonomous system 604. With the world models being shared, objects in the world model of the second autonomous system 604 can be handed to the mobile robot 608 of the first autonomous system 602, such as the work part 614. Since the world models are shared, the work part 614 can be manipulated by both the mobile robot 608 and the stationary robot 610.

Figure 6C:
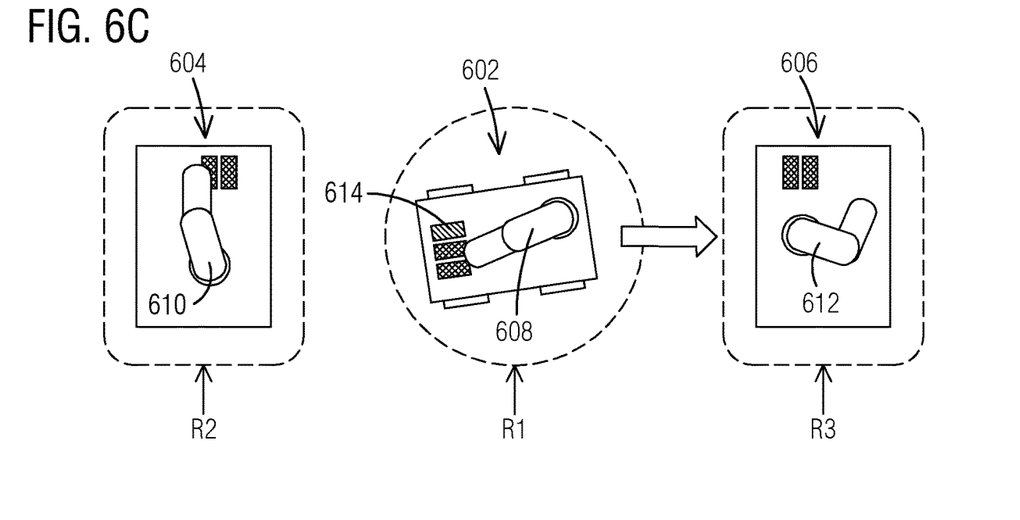

In FIG. 6C, the mobile robot 608 has moved away from the stationary robot 610. When the physical ranges associated with the first autonomous system 602 and the second autonomous system 604 no longer overlap, a termination trigger is determined, upon which the sharing of world model objects between the first autonomous system 602 and the second autonomous system 604 is terminated. At this point, the world model objects no longer need to be shared and the objects from the external systems can be purged from the local world model of each of the autonomous systems 602 and 604.

At termination of the sharing of world model objects, one or more world model objects may be transferred between the first autonomous system 602 and the second autonomous system 604. In this example, the work part 614 that used to be with the second autonomous system 604 is transferred to the world model first autonomous system 602. In one embodiment, the transfer of the one or more world model objects may be determined if, at the termination of the sharing of world model objects, those one or more world model objects are topologically connected to a different autonomous system than the autonomous system that those one or more world model objects were originally associated with. In this case, the rule can be that objects that are topologically connected to an autonomous system (such as the work part 614 touching the surface of the mobile robot 608) are not deleted when worlds are disconnected and purged. In another embodiment, the transfer of the one or more world model objects may be determined if, at the termination of the sharing of world model objects, those one or more world model objects are contained in a defined volume associated with a different autonomous system than the autonomous system that those one or more world model objects were originally associated with. In this case, the volume of the system's region can determine which objects are retained when worlds are split.

Figure 6D:
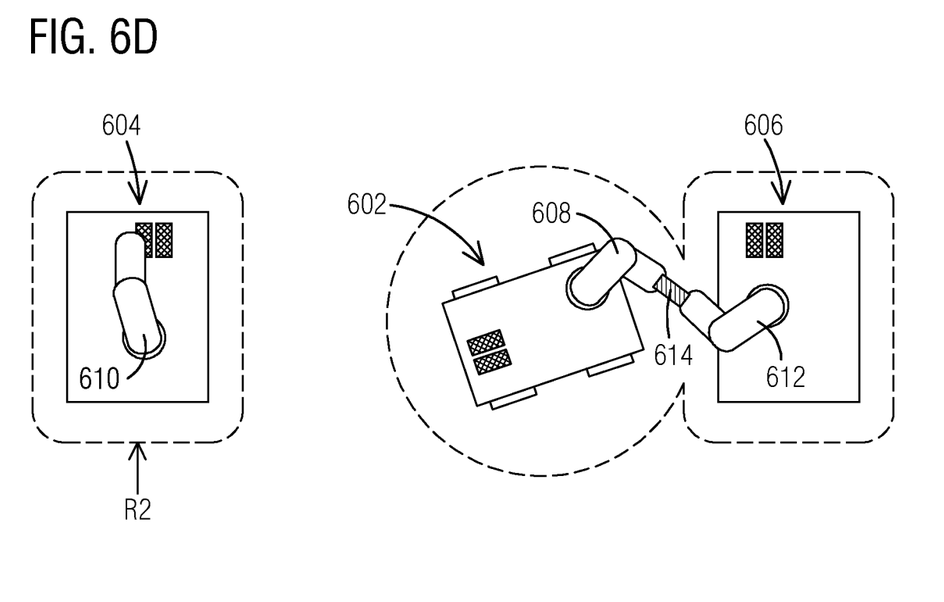
Figure 6E:
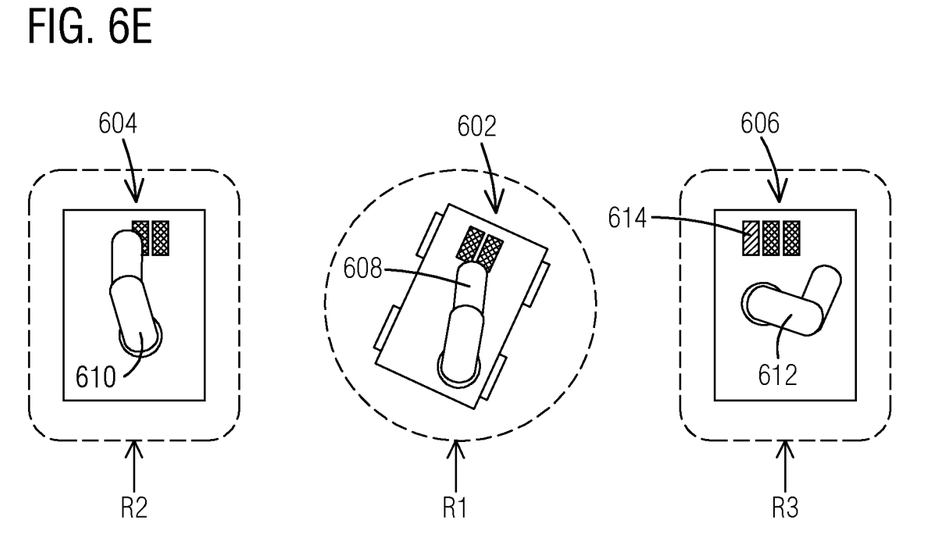

In FIG. 6D, the process repeats, but this time with the first autonomous system 602 and the third autonomous system 606. While the world models are shared, the mobile robot 608 passes the work part 614 to the stationary robot 612. In FIG. 6E, when the mobile robot 608 departs, the work part 614 stays with the third autonomous system 606 because it remains touching that third autonomous system's table. In this manner, shared objects may be transferred from one autonomous system to another in a manner similar to exchanging actual physical objects. The advantage is that the application programmer does no special programming to make such an exchange occur. It is a natural consequence of the interaction between world models of the various autonomous systems.

Figure 7:
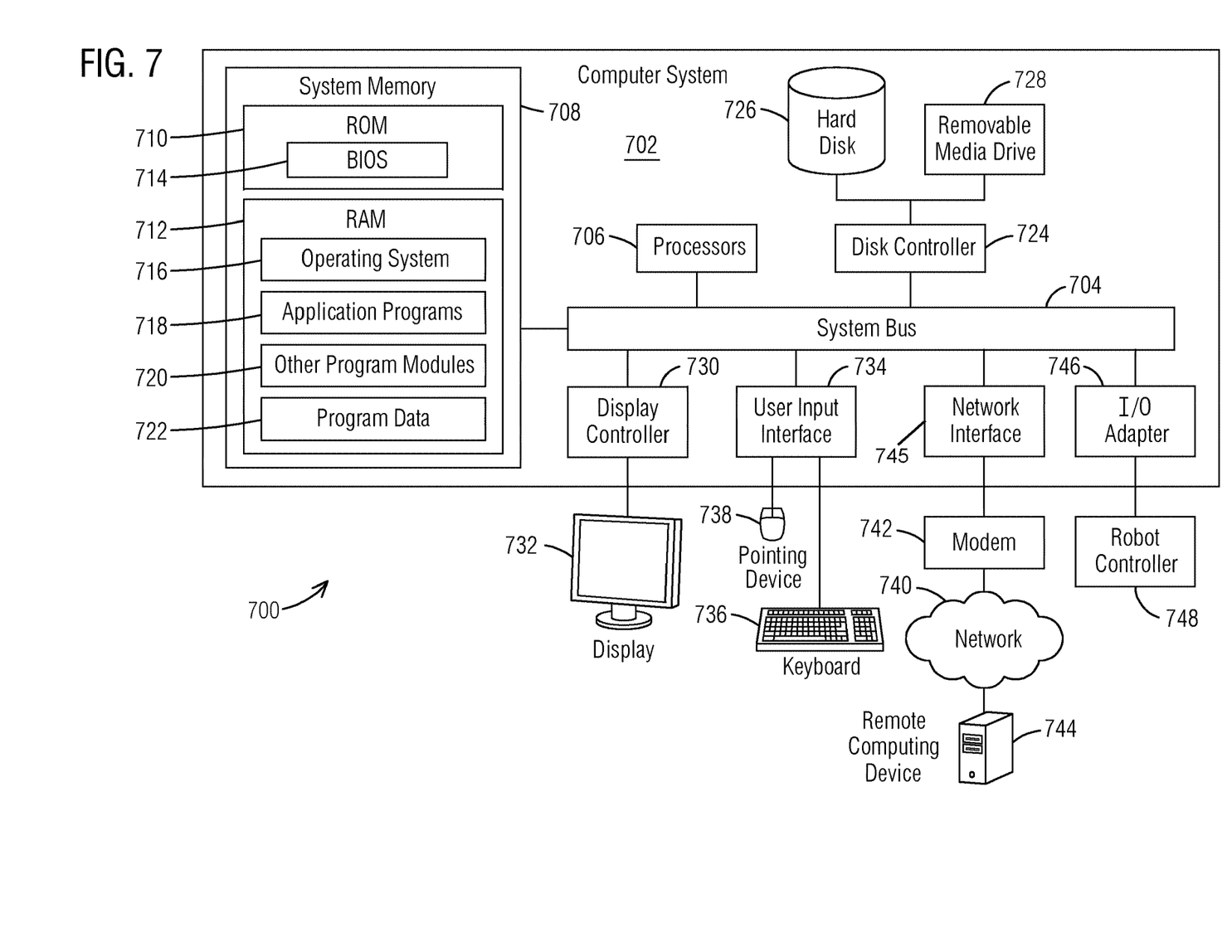
FIG. 7 illustrates an example of a computing system according to an aspect of the present disclosure.

FIG. 7 illustrates an exemplary computing environment comprising a computer system 702, within which aspects of the present disclosure may be implemented. The computing system 702 may be configured, for example, as a dedicated computer for an autonomous system. Computers and computing environments, such as computer system 702 and computing environment 700, are known to those of skill in the art and thus are described briefly here.

As shown in FIG. 7, the computer system 702 may include a communication mechanism such as a system bus 704 or other communication mechanism for communicating information within the computer system 702. The computer system 702 further includes one or more processors 706 coupled with the system bus 704 for processing the information. The processors 706 may include one or more central processing units (CPUs), graphical processing units (GPUs), or any other processor known in the art.

The computer system 702 also includes a system memory 708 coupled to the system bus 704 for storing information and instructions to be executed by processors 706. The system memory 708 may include computer readable storage media in the form of volatile and/or nonvolatile memory, such as read only memory (ROM) 710 and/or random access memory (RAM) 712. The system memory RAM 712 may include other dynamic storage device(s) (e.g., dynamic RANI, static RANI, and synchronous DRAM). The system memory ROM 710 may include other static storage device(s) (e.g., programmable ROM, erasable PROM, and electrically erasable PROM). In addition, the system memory 708 may be used for storing temporary variables or other intermediate information during the execution of instructions by the processors 706. A basic input/output system 714 (BIOS) containing the basic routines that help to transfer information between elements within computer system 702, such as during start-up, may be stored in system memory ROM 710. System memory RAM 712 may contain data and/or program modules that are immediately accessible to and/or presently being operated on by the processors 706. System memory 708 may additionally include, for example, operating system 716, application programs 718, other program modules 720 and program data 722.

The computer system 702 also includes a disk controller 724 coupled to the system bus 704 to control one or more storage devices for storing information and instructions, such as a magnetic hard disk 726 and a removable media drive 728 (e.g., floppy disk drive, compact disc drive, tape drive, and/or solid state drive). The storage devices may be added to the computer system 702 using an appropriate device interface (e.g., a small computer system interface (SCSI), integrated device electronics (IDE), Universal Serial Bus (USB), or FireWire).

The computer system 702 may also include a display controller 730 coupled to the system bus 704 to control a display 732, such as a cathode ray tube (CRT) or liquid crystal display (LCD), among other, for displaying information to a computer user. The computer system 702 includes a user input interface 734 and one or more input devices, such as a keyboard 736 and a pointing device 738, for interacting with a computer user and providing information to the one or more processors 706. The pointing device 738, for example, may be a mouse, a light pen, a trackball, or a pointing stick for communicating direction information and command selections to the one or more processors 706 and for controlling cursor movement on the display 732. The display 732 may provide a touch screen interface which allows input to supplement or replace the communication of direction information and command selections by the pointing device 738.

The computing system 702 also includes an I/O adapter 746 coupled to the system bus 704 to connect the computing system 702 to a controllable physical device, such as a robot. In the example shown in FIG. 7, the I/O adapter 746 is connected to robot controller 748, which includes, for example, one or more motors for controlling linear and/or angular positions of various parts (e.g., arm, base, etc.) of the physical device or robot.

The computer system 702 may perform a portion or all of the processing steps of embodiments of the disclosure in response to the one or more processors 706 executing one or more sequences of one or more instructions contained in a memory, such as the system memory 708. Such instructions may be read into the system memory 708 from another computer readable storage medium, such as a magnetic hard disk 726 or a removable media drive 728. The magnetic hard disk 726 may contain one or more datastores and data files used by embodiments of the present disclosure. Datastore contents and data files may be encrypted to improve security. The processors 706 may also be employed in a multi-processing arrangement to execute the one or more sequences of instructions contained in system memory 708. In alternative embodiments, hard-wired circuitry may be used in place of or in combination with software instructions. Thus, embodiments are not limited to any specific combination of hardware circuitry and software.

The computer system 702 may include at least one computer readable storage medium or memory for holding instructions programmed according to embodiments of the disclosure and for containing data structures, tables, records, or other data described herein. The term "computer readable storage medium" as used herein refers to any medium that participates in providing instructions to the one or more processors 706 for execution. A computer readable storage medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 726 or removable media drive 728. Non-limiting examples of volatile media include dynamic memory, such as system memory 708. Non-limiting examples of transmission media include coaxial cables, copper wire, and fiber optics, including the wires that make up the system bus 704. Transmission media may also take the form of acoustic or light waves, such as those generated during radio wave and infrared data communications.

The computing environment 700 may further include the computer system 702 operating in a networked environment using logical connections to one or more remote computers, such as remote computing device 744. Remote computing device 744 may be a personal computer (laptop or desktop), a mobile device, a server, a router, a network PC, a peer device or other common network node, and typically includes many or all of the elements described above relative to computer system 702. When used in a networking environment, computer system 702 may include a modem 742 for establishing communications over a network 740, such as the Internet. Modem 742 may be connected to system bus 704 via network interface 745, or via another appropriate mechanism.

Network 740 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 702 and other computers (e.g., remote computing device 744). The network 740 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 740.

The embodiments of the present disclosure may be implemented with any combination of hardware and software. In addition, the embodiments of the present disclosure may be included in an article of manufacture (e.g., one or more computer program products) having, for example, a non-transitory computer-readable storage medium. The computer readable storage medium has embodied therein, for instance, computer readable program instructions for providing and facilitating the mechanisms of the embodiments of the present disclosure. The article of manufacture can be included as part of a computer system or sold separately.

The computer readable storage medium can include a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Computer readable program instructions described herein can be downloaded to respective computing/processing devices from a computer readable storage medium or to an external computer or external storage device via a network, for example, the Internet, a local area network, a wide area network and/or a wireless network.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A non-transitory computer-implemented method comprising:
   operating a first autonomous system to perform a task based on executable code derived from objects in a world model of the first autonomous system, wherein the world model of the first autonomous system comprises a plurality of world model objects that represent a state of an operating environment of the first autonomous system,
   determining an initiation trigger when the first autonomous system is to begin interaction with a second autonomous system, the second autonomous system being operated based on executable code derived from objects in a world model of the second autonomous system, which comprises a plurality of world model objects that represent a state of an operating environment of the second autonomous system,
   responsive to the initiation trigger, initiating data communication between the first autonomous system and the second autonomous system, wherein the data communication comprises sharing of the world model objects between the first autonomous system and the second autonomous system, and
   continuing operating the first autonomous system based on an extended world model of the first autonomous system that includes the shared world model objects of the second autonomous system.

2. The method according to claim 1, wherein the shared world model objects of the first autonomous system and the second autonomous system comprise, in each case, one or more world model objects that correspond to one or more physical objects in the operating environment of the respective autonomous system.

3. The method according to claim 1, wherein the shared world model objects of the first autonomous system and the second autonomous system further comprise, in each case, one or more world model objects that correspond to one or more markers on simulated objects in the operating environment of the respective autonomous system.

4. The method according to claim 1, wherein the initiation trigger is determined when a physical range associated with the first autonomous system overlaps with a physical range associated with the second autonomous system.

5. The method according to claim 1, further comprising terminating the sharing of world model objects between the first autonomous system and the second autonomous system responsive to a determination of a termination trigger.

6. The method according to claim 5, wherein the termination trigger is determined when a physical range associated with the first autonomous system no longer overlaps with a physical range associated with the second autonomous system.

7. The method according to claim 5, further comprising transferring one or more world model objects between the first autonomous system and second autonomous system at termination of the sharing of world model objects.

8. The method according to claim 7, comprising:
   determining, at the termination of the sharing of world model objects, whether said one or more world model objects are topologically connected to a different autonomous system than the autonomous system that said one or more world model objects were originally associated with, and
   transferring said one or more world model objects when they are determined to be topologically connected to the different autonomous system.

9. The method according to claim 7, comprising:
   determining, at the termination of the sharing of world model objects, whether said one or more world model objects are contained in a defined volume associated with a different autonomous system than the autonomous system that said one or more world model objects were originally associated with, and
   transferring said one or more world model objects when they are determined to be contained in the defined volume.

10. The method according to claim 1, wherein subsequent to the sharing of the world model objects, the second autonomous system is operated based on an extended world model of the second autonomous system that includes the shared world model objects of the first autonomous system.

11. The method according to claim 1, wherein the sharing of the world model objects between the first autonomous system and the second autonomous system is implemented via a middleware layer.

12. The method according to claim 11, comprising:
    each of the autonomous systems publishing updated data in connection with the world model objects of that autonomous system via the middleware layer at discrete time steps, and
    subsequent to the initiation trigger, each of the autonomous systems polling the other autonomous system via the middleware layer to discover published world model objects of the other autonomous system.

13. The method according to claim 11, comprising locally caching, by each of the autonomous systems, synchronized copies of the shared world model objects of the other autonomous system at discrete time steps.

14. The method according to claim 11, wherein the shared world model objects of the first autonomous system and the second autonomous system are collected in a common database accessible to each of the first and second autonomous systems.

15. The method according to claim 1, the shared world model objects comprise static data that is class-dependent and data that is subject to change at runtime.

16. The method according to claim 1, wherein the sharing of the world model objects comprises data transfer implemented in multiple stages, comprising:
    a first stage involving a one-time transfer of all static data in connection with the shared world model objects,
    a second stage involving one or more synchronizing steps that includes transfer of all data in connection with the shared world model objects that are subject to change at runtime of the respective autonomous system,
    a third stage involving one or more synchronicity maintenance steps that include only transfer of data related to device control,
    a fourth stage involving one or more error correction steps that include transfer of data to correct errors arising due to a difference in simulation output between the first and second autonomous systems.

17. A non-transitory computer-readable storage medium, the computer-readable storage medium including instructions that when executed by a computer of an autonomous system, cause the computer to:
    operate a controllable physical device of the autonomous system to perform a task based on executable code derived from objects in a world model of the autonomous system, wherein the world model of the autonomous system comprises a plurality of world model objects that represent a state of an operating environment of the autonomous system, determine an initiation trigger when the autonomous system is to begin interaction with a peer autonomous system, the peer autonomous system being operated based on executable code derived from objects in a world model of the peer autonomous system, which comprises a plurality of world model objects that represent a state of an operating environment of the peer autonomous system, responsive to the initiation trigger, initiate data communication between the autonomous system and the peer autonomous system, wherein the data communication comprises sharing of the world model objects between the autonomous system and the peer autonomous system, and continue operating controllable physical device based on an extended world model of the autonomous system that includes the shared world model objects of the peer autonomous system.

18. An autonomous system comprising:

a controllable physical device; and a computer comprising a processor and a memory storing instructions that, when executed by the processor, configure the computer to:

operate the controllable physical device to perform a task based on executable code derived from objects in a world model of the autonomous system, wherein the world model of the autonomous system comprises a plurality of world model objects that represent a state of an operating environment of the autonomous system, determine an initiation trigger when the autonomous system is to begin interaction with a peer autonomous system, the peer autonomous system being operated based on executable code derived from objects in a world model of the peer autonomous system, which comprises a plurality of world model objects that represent a state of an operating environment of the peer autonomous system, responsive to the initiation trigger, initiate data communication between the autonomous system and the peer autonomous system, wherein the data communication comprises sharing of the world model objects between the autonomous system and the peer autonomous system, and continue operating the controllable physical device based on an extended world model of the autonomous system that includes the shared world model objects of the peer autonomous system.

* * * * *